(12) United States Patent
Kani et al.

(10) Patent No.: US 10,099,302 B2
(45) Date of Patent: *Oct. 16, 2018

(54) TABLETOP CUTTING DEVICE

(71) Applicant: MAKITA CORPORATION, Anjo-shi, Aichi (JP)

(72) Inventors: Toshiyuki Kani, Anjo (JP); Yoshihiro Kimura, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,321

(22) Filed: Jun. 30, 2017

(65) Prior Publication Data

US 2017/0334004 A1 Nov. 23, 2017

Related U.S. Application Data

(63) Continuation of application No. 14/765,454, filed as application No. PCT/JP2013/082944 on Dec. 9, 2013, now Pat. No. 9,827,622.

(30) Foreign Application Priority Data

Feb. 1, 2013 (JP) .................. 2013-018892

(51) Int. Cl.
*B23D 47/02* (2006.01)
*B23D 45/04* (2006.01)
(Continued)

(52) U.S. Cl.
CPC ......... *B23D 47/025* (2013.01); *B23D 45/042* (2013.01); *B23D 45/048* (2013.01);
(Continued)

(58) Field of Classification Search
CPC .. B23D 47/025; B23D 47/042; B23D 47/048; B23D 47/00; B25F 5/02; B27B 5/29
See application file for complete search history.

(56) References Cited

U.S. PATENT DOCUMENTS 5,028,858 A 7/1991 Schnizler et al.
5,208,525 A * 5/1993 Lopic ................. A01G 3/053
310/50
(Continued)

FOREIGN PATENT DOCUMENTS

JP S58-71101 A 4/1983
JP S59-49901 A 3/1984
(Continued)

OTHER PUBLICATIONS

Feb. 10, 2014 Search Report issued in International Patent Application No. PCT/JP2013/082944.
(Continued)

*Primary Examiner* — Omar Flores Sanchez
(74) *Attorney, Agent, or Firm* — Oliff PLC

(57) ABSTRACT

Two 18V-type rechargeable batteries (31 and 31) are attached in series so as to allow a 36V-type tabletop cutting device (C1) to be utilized. By utilizing the 18V batteries which are highly prevalent for electric tools, it is possible to use the 36V-type tabletop cutting device (C1) as well as to reduce costs for the batteries.

1 Claim, 19 Drawing Sheets

(51) Int. Cl.
  *B23D 47/00* (2006.01)
  *B27B 5/29* (2006.01)
  *B25F 5/02* (2006.01)

(52) U.S. Cl.
  CPC ............... *B23D 47/00* (2013.01); *B25F 5/02* (2013.01); *B27B 5/29* (2013.01)

(56) References Cited

U.S. PATENT DOCUMENTS

| | | | |
|---|---|---|---|
| 5,589,288 | A | 12/1996 | Coulson et al. |
| 6,286,609 | B1 * | 9/2001 | Carrier ............... B25F 5/02 173/1 |
| 7,406,902 | B2 | 8/2008 | Shibata et al. |
| 2005/0257656 | A1 | 11/2005 | Shibata et al. |
| 2011/0162219 | A1 | 7/2011 | Okouchi |
| 2011/0198103 | A1 | 8/2011 | Suzuki |
| 2011/0284257 | A1 | 11/2011 | Ogino et al. |
| 2012/0055308 | A1 | 3/2012 | Ota et al. |
| 2013/0187461 | A1 | 7/2013 | Goto et al. |
| 2015/0328796 | A1 | 11/2015 | Okouchi et al. |

FOREIGN PATENT DOCUMENTS

| | | |
|---|---|---|
| JP | 2000-025001 A | 1/2000 |
| JP | 2000-308268 A | 11/2000 |
| JP | 2007-083610 A | 4/2007 |
| JP | 2007-260795 A | 10/2007 |
| JP | 2009-136961 A | 6/2009 |
| JP | 2010-173029 A | 8/2010 |
| JP | 2011-161603 A | 8/2011 |
| JP | 2012-055994 A | 3/2012 |
| JP | 2014-148023 A | 8/2014 |

OTHER PUBLICATIONS

May 6, 2016 Office Action issued in Japanese Patent Application No. 2013-018892.
Nov. 29, 2016 Office Action issued in Japanese Patent Application No. 2013-018892.
Jan. 23, 2018 Office Action issued in Japanese Patent Application No. 2017-029836.

* cited by examiner

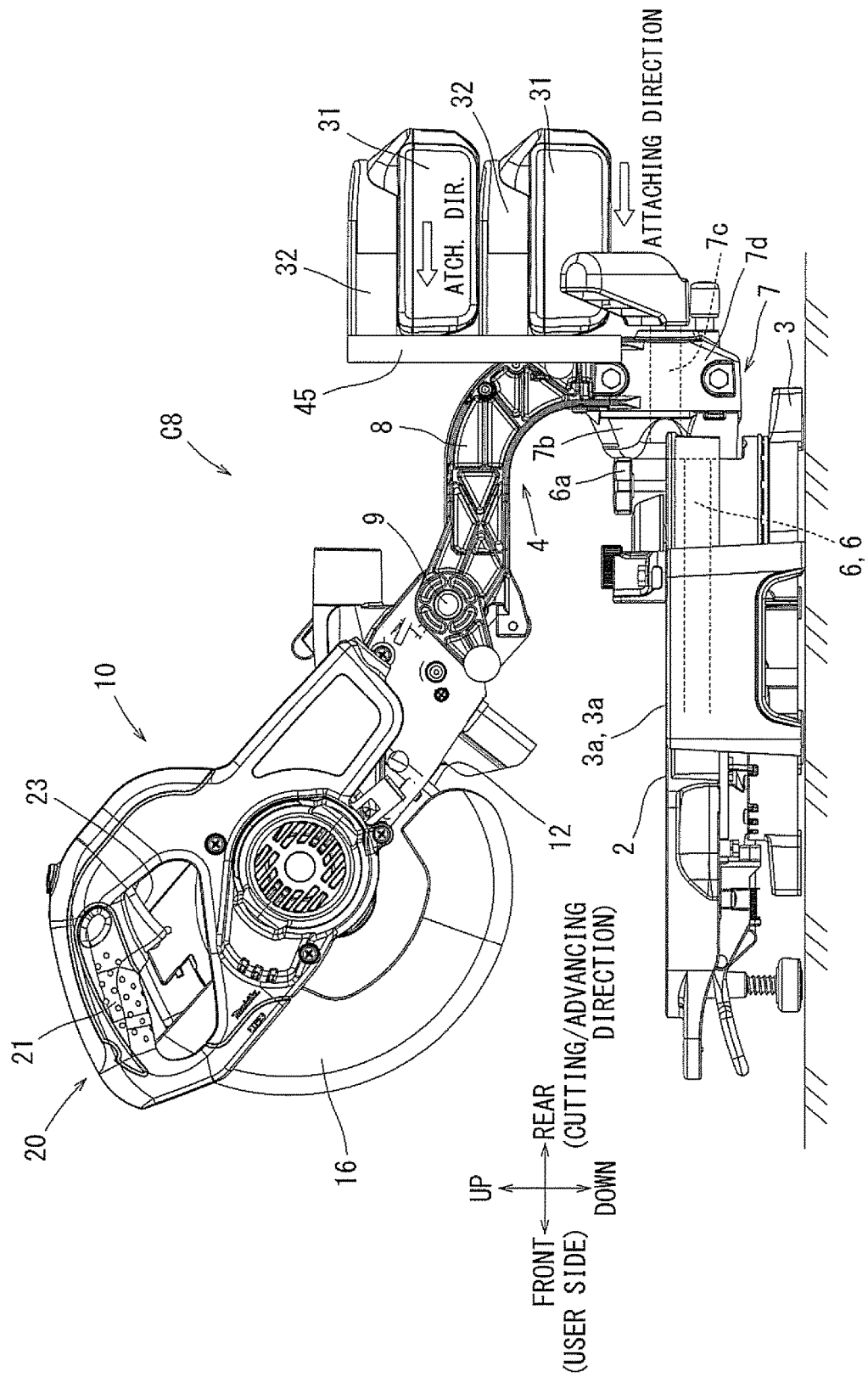

TABLETOP CUTTING DEVICE

TECHNICAL FIELD

The present invention relates to a tabletop type cutting device which includes a rotary blade such as, for example, a circular grindstone, a saw blade, and a chip saw.

BACKGROUND ART

Japanese Laid-Open Patent Application No. 2010-173029 and Japanese Laid-Open Patent Application No. 2007-83610 disclose techniques relating to a tabletop type cutting device. The tabletop cutting device is provided with a table for mounting a cutting material on the top surface thereof and a cutting device main body which is supported above the table and is operated to move vertically. The tabletop cutting device performs cutting processing by moving the cutting device main body downward while rotating a rotary blade and then cutting the cutting material which is fixed on the table by using the rotary blade.

In recent years, electric tools such as an electric screwdriver and a cutting tool etc. have generally become cordless. In the abovementioned tabletop cutting device, rechargeable batteries have been widely used as a power source. Without limiting the abovementioned tabletop cutting device, batteries of which the output voltage is, for example, 18V or 36V have been widely provided as batteries of the electric tool. When the tool is a relatively small-sized and handheld tool and a low output model, an 18V-output battery (18V battery) is mainly used, and when the tool is a relatively large-sized (high output) cutting tool which requires a higher output, a large-sized 36V-output battery (36V battery) is used.

However, an 18V battery cannot be used in a high-output cutting tool in which a 36V battery is used as a dedicated power source. Thus, a user has to additionally prepare a 36V battery dedicated to the high-output cutting tool. In this regard, there is a problem of high costs, and there is a room to improve handling property of the high-output cutting tool.

Thus, there is a need in the art to further improve convenience and handling property of a cutting tool by allowing the relatively high-output cutting tool to utilize a low-output battery as a power source thereof.

SUMMARY

A tabletop cutting device according to the present disclosure may include a table on which a cutting material is placed, and a cutting device main body that is operated in a vertically movable manner with respect to the table and includes a circular rotary blade which is rotated by an electric motor. Furthermore, the cutting device main body may include a plurality of battery attachment sections for attaching rechargeable batteries such that the batteries are slidably attached to the battery attachment sections.

According to the present disclosure, it is possible to use the high-output cutting tool by attaching two low-output batteries. Thus, it is possible to effectively utilize the low-output battery and to further improve convenience and handling properties of the high-output cutting tool.

As an attachable battery, a slidably-attachment-type battery, which can be attached to the battery attachment section by engaging a pair of rail reception sections provided on one surface of the battery with rails provided on the battery attachment section side, can be applied.

In the tabletop cutting device according to a more preferable embodiment of the present disclosure, the plurality of the battery attachment sections may be disposed side by side along a direction perpendicular to a plane of the rotary blade. According to the embodiment, it is possible to attach the batteries at multiple locations in a surface direction of the rotary blade in a compact manner, and it is also possible to attach two batteries in the above-mentioned direction of the tabletop cutting device without damaging the compactness.

The tabletop cutting device according to a still more preferable embodiment of the present disclosure may further include a biasing means for biasing the cutting device main body in an upward direction toward a standby position side. Furthermore, the cutting device main body may be configured to be returned to the standby position side such that weight of the batteries which are attached to the battery attachment sections serves as a weight. According to the embodiment, it is possible to decrease a biasing force for returning the cutting device main body to the standby position in an upper direction. Accordingly, since it is possible to decrease operational power for moving the cutting device main body downward against the biasing force, it is possible to improve operability and workability of the tabletop cutting device.

In the tabletop cutting device according to a still more preferable embodiment of the present disclosure, the cutting device main body may include a main grip part which a user holds when the user performs an up-down movement operation of the cutting device main body. The cutting device main body may further include a sub grip part which is provided at an end portion of the main grip part on a side opposite to the user, and the sub grip part is placed parallel to a top surface of the table and capable of being used for carrying the tabletop cutting device when the cutting device main body is held at a lower moving end. Furthermore, the plurality of the battery attachment sections may be disposed at an end portion of the sub grip part on a side opposite to the main grip part. According to the embodiment, the battery or the battery attachment sections may not interfere with the user when the user holds the main grip part or the sub grip part. Thus, it is possible to attach a plurality of the batteries without damaging operability and handling properties of the tabletop cutting device.

In the tabletop cutting device according to a still more preferable embodiment of the present disclosure, the cutting device main body may be supported so as to be operated in a vertically tiltable manner with respect to the table. Furthermore, the cutting device main body may be configured such that a center of gravity of the cutting device main body is displaced to a side opposite to a vertical plane which passes through a tilting fulcrum of the cutting device main body in the course of the vertical tilting of the cutting device main body. According to the embodiment, it is possible that a weight of the cutting device main body may serve as an external force for locating and maintaining the cutting device main body at both of the standby position in the upper portion and a lower moving end. Accordingly, it is possible to improve operability when moving up and down the cutting device main body.

In the tabletop cutting device according to a still more preferable embodiment of the present disclosure, the plurality of the battery attachment sections may be connected to the cutting device main body via a power cord. According to the embodiment, it is possible to reduce the weight of the cutting device main body. Thus, it is possible to improve operability when moving the cutting device main body in an upward and downward direction.

In the tabletop cutting device according to a still more preferable embodiment of the present disclosure, the battery attachment sections to which the batteries are attached may be utilized as an auxiliary table having the same height as that of the table when the battery attachment section is placed on an installation surface on which the tabletop cutting device is placed. According to the embodiment, it is possible that the battery attachment section to which a battery is attached may have an additional function of an auxiliary table. Thus, it is possible to improve functionality of the battery attachment section and eventually the tabletop cutting device.

BRIEF DESCRIPTION OF DRAWINGS

FIG. 20 is a right-side view of the tabletop cutting device of the eighth embodiment.

DETAILED DESCRIPTION

Figure 1:
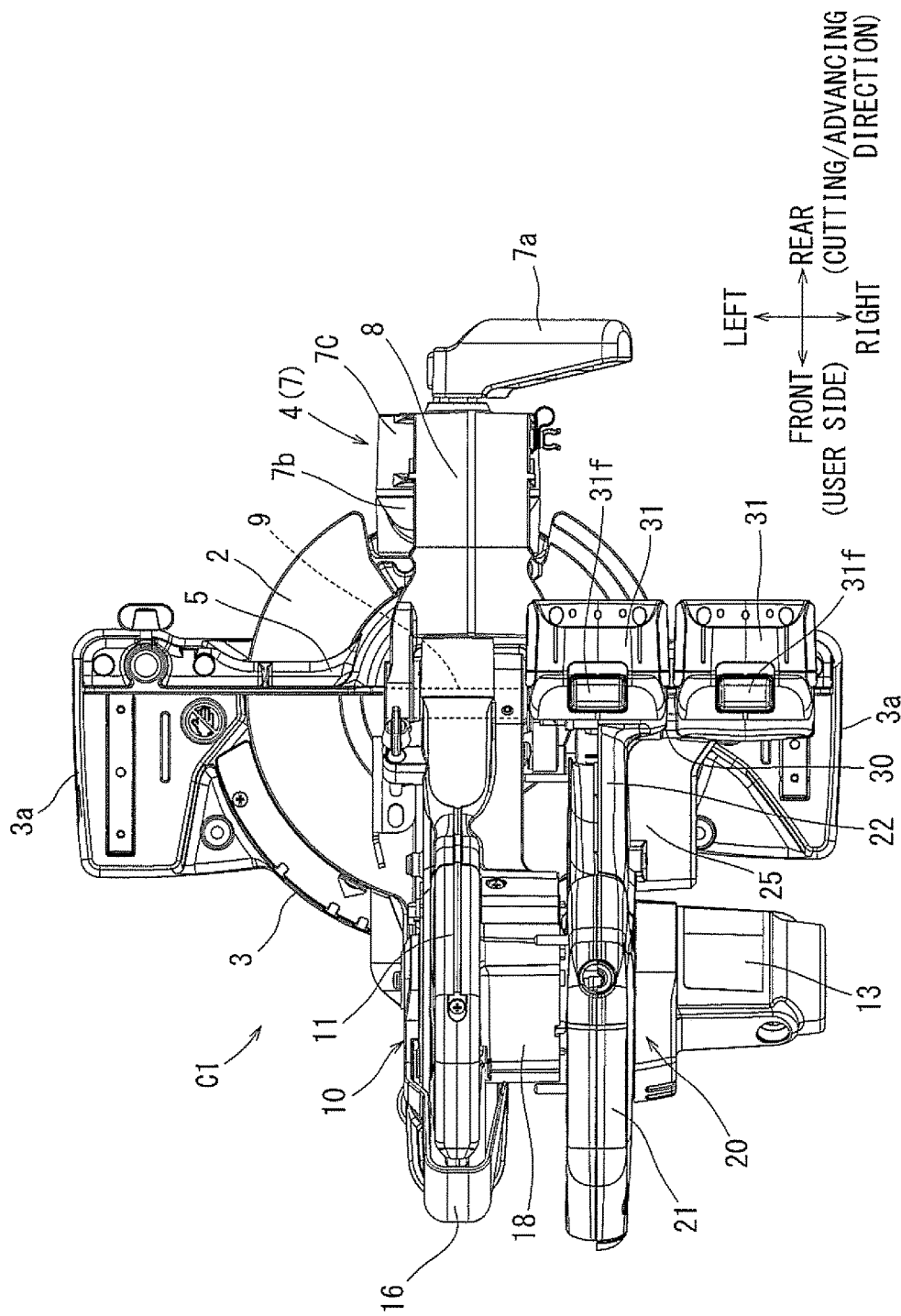
FIG. 1 is a plan view of a tabletop cutting device of a first embodiment.

Next, first to eighth embodiments of the present disclosure will be described with reference to FIGS. 1 to 20. The embodiments described below are different from one another in the form of the attachment of a battery as a power source, and are the same in the basic configuration as a tabletop cutting device. In addition, since the embodiments described below are the same as the well-known configuration of the related art, the same reference numerals and signs are applied thereto, and detailed descriptions will be omitted.

Figure 2:
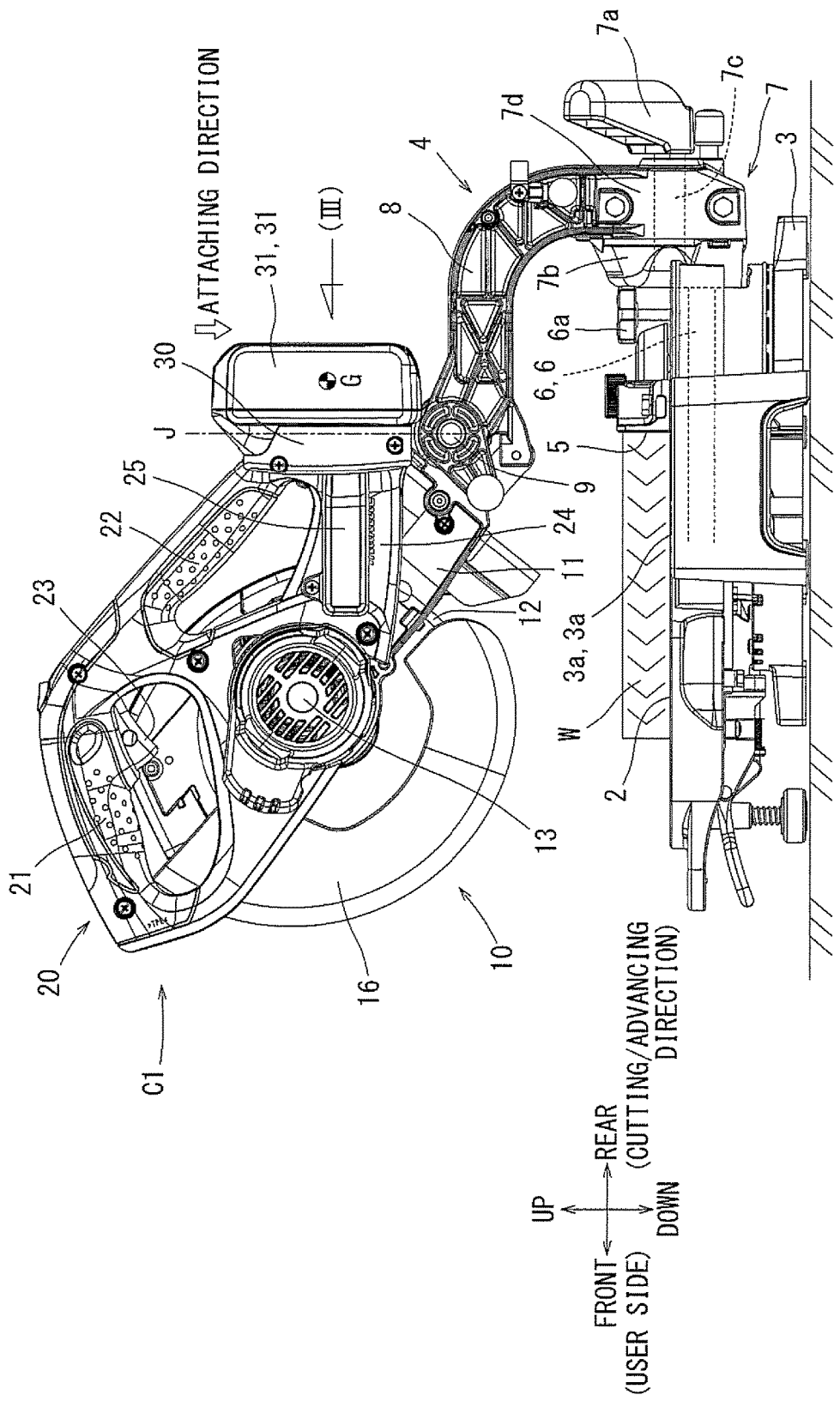
FIG. 2 is a right-side view of the tabletop cutting device of the first embodiment.

As illustrated in FIGS. 1 and 2, a tabletop cutting device C1 of the first embodiment may include a table 2 for fixing a cutting material W on a top surface, a base 3 for supporting the table 2 so as to be rotatable within a certain range in a horizontal direction, a main body support section 4 provided on a rear portion (a left end portion in FIG. 1) of the table 2, and a cutting device main body 10 supported by the main body support section 4 above the table 2. A user is positioned on a left side of the tabletop cutting device C1 in FIGS. 1 and 2.

A positioning fence 5 for positioning the cutting material W on a table surface may be disposed on a top surface of the table 2. The positioning fence 5 may be fixed across auxiliary tables 3a and 3a provided on the right and left sides of the base 3. The top surface of the table 2 may be disposed having a small gap so as to allow a horizontal rotation of the table 2. The cutting material W positioned by the positioning fence 5 may be fixed along the top surface of the table 2 by a clamp device (not illustrated).

The main body support section 4 may include a pair of slide bars 6 and 6 on the right and left sides for supporting a cutting device main body 10 to be slidable in a horizontal direction with respect to the table 2, a right-left tilt supporting mechanism 7 for tilting the cutting device main body 10 to the right and left (in a direction orthogonal to a sheet in FIG. 2) when viewed from a user, and a main body supporting arm 8 for supporting the cutting device main body 10 so as to be vertically tiltable via a vertically tilting shaft 9. The cutting device main body 10 may be supported to be slidable in a front-rear direction along a table surface direction via the slide bars 6 and 6. Cutting direction of the cutting material W (cutting/advancing direction) may correspond to the sliding direction of the cutting device main body 10 toward a rear direction by both the slide bars 6 and 6. It may be possible to fix a slide position of the cutting device main body 10 by tightening a fixing screw 6a.

The right-left tilt supporting mechanism 7 may include a tilt base section 7b which is attached to the rear portion of the table 2 and a tiltable section 7d which is joined so as to be relatively rotatable with respect to the tilt base section 7b via the right-left tilting shaft 7c. A main body supporting arm 8 may be provided on an upper portion of the tiltable section 7d. It may be possible to fix the tiltable section 7d to the tilt base section 7b so as not to relatively rotatable by tightening a fixing lever 7a attached to a rear end portion of the right-left tilting shaft 7c and tightening a screw portion provided in the right-left tilting shaft 7c. Accordingly, it may be possible to fix the cutting device main body 10 to a perpendicular-cutting position or a right or left tilting position.

The main body supporting arm 8 is curbed in an L-shape, and a main body case 11 of the cutting device main body 10 may be supported on a curbed tip end side in a vertically tiltable manner via the vertically tilting shaft 9. This main body case 11 may cover a substantially semicircular area of an upper side of a circular rotary blade 12. The rotary blade 12 may be attached to a spindle (not illustrated). The spindle may be rotatably supported by the main body case 11, and may be rotated with an electric motor 13 and a reduction gear unit 18 which are attached to a rear surface side (right side surface) of the main body case 11.

As illustrated in FIG. 2, a substantially semicircular area of a lower side of the rotary blade 12 may be configured to be covered by a movable cover 16. The movable cover 16 may be opened and closed by interlocking with a vertically tilting operation of the cutting device main body 10 via a link mechanism (not illustrated). As illustrated in FIG. 2, when the cutting device main body 10 is positioned at an upper dead point, the movable cover 16 is closed, and when the cutting device main body 10 is tilted downward, the movable cover 16 may be rotated in a clockwise direction in FIG. 2 and gradually opened.

The cutting device main body 10 may be configured to be biased in an upper tilting direction by a torsion spring (not illustrated) attached to a periphery of the vertically tilting shaft 9. The user can perform a cutting processing by carrying out a pressing-down operation of the cutting device main body 10 against the biasing force. When the pressing-down operation of the cutting device main body 10 is released, the cutting device main body 10 may be returned to a standby position (upper dead point) in an upper direction by the biasing force.

A large-sized handle section 20 held by a user may be provided in the vicinity of a connecting portion of an electric motor 13 and a reduction gear unit 18 in a rear surface side of the main body case 11. The handle section 20 may be provided with a front side main grip part 21 and a rear side sub grip part 22. When the user holds the front side main grip part 21 and performs a pulling operation of a trigger-type switch lever 23 with a fingertip, the electric motor 13 may be activated to rotate the rotary blade 12. In addition, when the user holds the main grip part 21 and tilts the cutting device main body 10 downward, the cutting material W can be cut into with the rotary blade 12. Furthermore, the user can slide the cutting device main body 10 in a cutting/advancing direction while holding the main grip part 21.

The sub grip part 22 may extend to a direction of being curbed in an L-shape toward the main grip part 21. When the cutting device main body 10 is positioned at a lower dead point, the sub grip part 22 may be placed in a substantially parallel position with respect to a table surface direction. The sub grip part 22 may function as a carrying handle when the cutting device main body 10 is fixed to the lower dead point to carry the tabletop cutting device C1.

Figure 3:
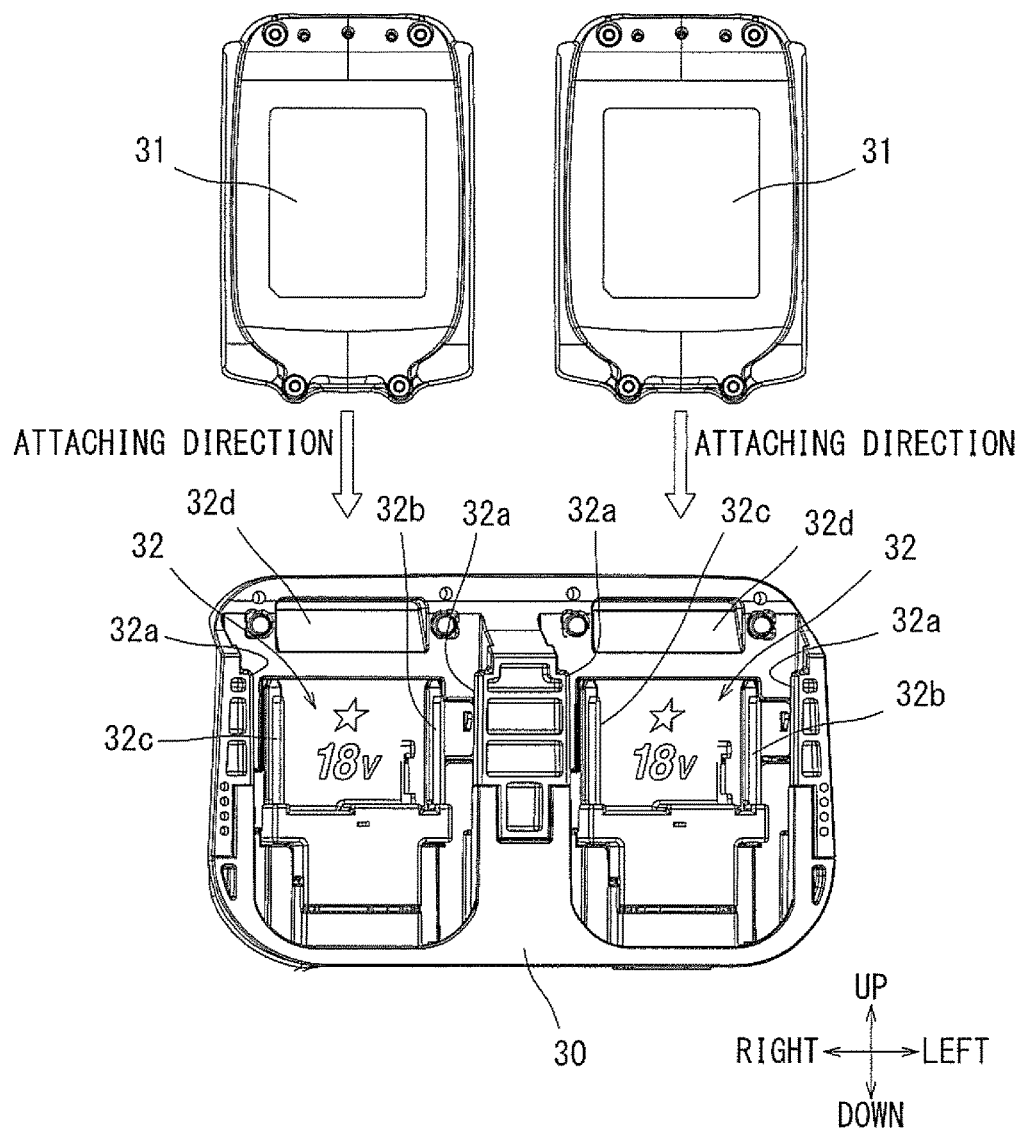
FIG. 3 is a view illustrating a state where two batteries are respectively detached from a battery attachment section, viewed from an arrow (III) in FIG. 2.

Two batteries 31 and 31 may be attached to a rear end portion of the handle section 20 in a rear portion of the sub grip part 22 via a battery base 30. The battery base 30 may have a flat plate shape in a vertical and horizontal directions in the vicinity of a joint part of a handle arm 24 extending from a rear surface of the electric motor 13 and a rear portion of the sub grip part 22. As illustrated in FIG. 3, two battery attachment sections 32 and 32 may be provided on a rear surface of the battery base 30. The two battery attachment sections 32 and 32 may be disposed laterally aligned (parallel) in a horizontal direction. An 18V battery 31 may be attached on each of the battery attachment sections 32 and 32. In this embodiment, a lithium-ion battery which houses multiple cells can be attached to the battery case. The 18V batteries 31 and 31 may be slidably-attachment-type batteries used as a power source of other electric tools such as an electric screwdriver etc., and can be used among the tabletop cutting device C1. In addition, the batteries 31 and 31 can be detached from battery attachment sections 32 and 32 and used as a repeatedly usable power source by being charged with a separately prepared charger.

Figure 4:
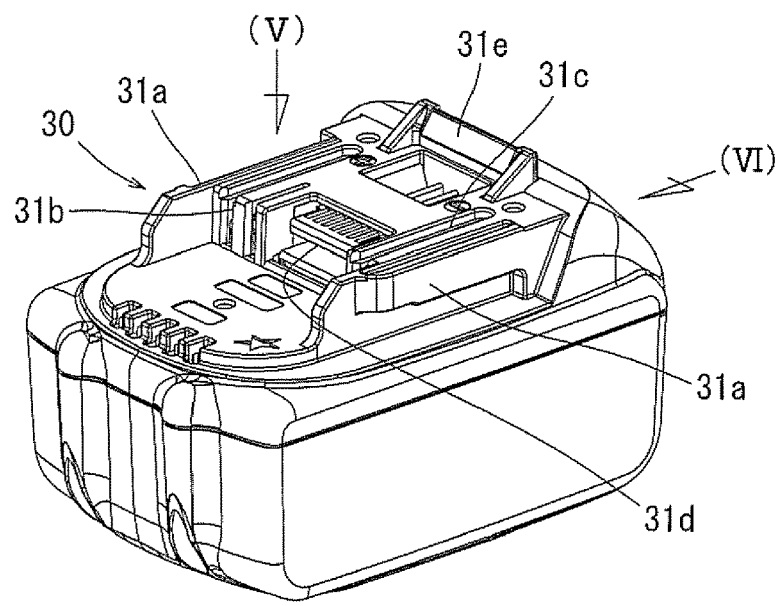
FIG. 4 is a perspective view of a single battery unit.
Figure 5:
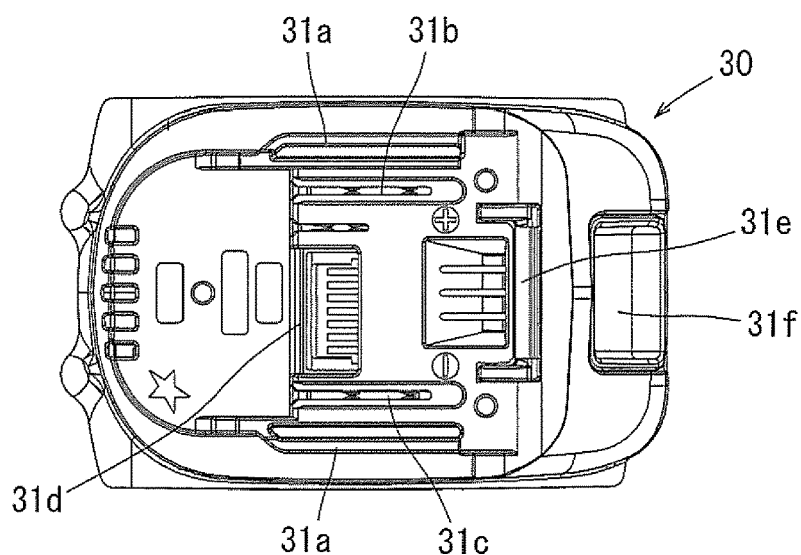
FIG. 5 is a top view of the single battery unit when viewed from an arrow (V) in FIG. 4.
Figure 6:
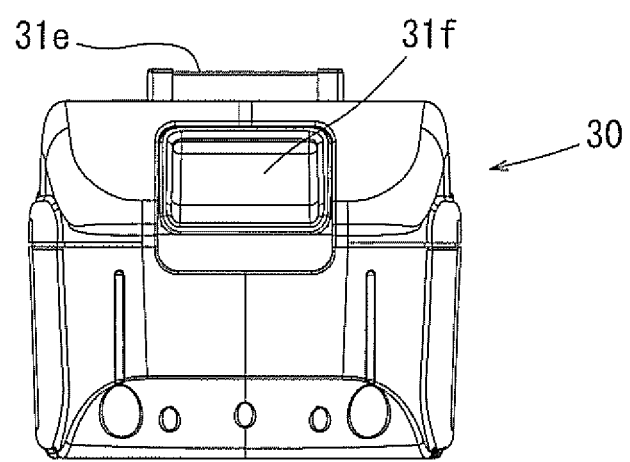
FIG. 6 is a rear view of the single battery unit when viewed from an arrow (VI) in FIG. 4.

As illustrated in FIGS. 4 to 6, a pair of rail reception sections 31a and 31a may be provided on right and left sides of a top surface of the battery 31 having a cuboid shape. Positive and negative terminal reception sections 31b and 31c may be disposed between both the rail reception sections 31a and 31a. Between the positive and negative terminal reception sections 31b and 31c, a connector section 31d may be provided for transmitting and receiving a control signal to and from a battery charger when performing charging with the charger. In addition, a lock claw 31e may be provided on a rear portion of an upper surface of the battery 31. The lock claw 31e may be spring-urged in a direction protruding upward. The lock claw 31e can be moved to an unlocked position in a lower direction against the spring-biased force by performing a pressing operation of an unlock button 31f provided on a rear surface with a fingertip.

As illustrated in FIG. 3, both the battery attachment sections 32 and 32 may have the same configuration. In addition, both the battery attachment sections 32 and 32 may be electrically connected to each other in series. The pair of left and right rail sections 32a and 32a may be provided on the battery attachment section 32. Positive and negative connection terminals 32b and 32c may be disposed between both the rail sections 32a and 32a. An engagement concave section 32d with which the lock claw 31e (refer to FIG. 4) of the battery 31 is engaged may be provided on an upper portion (illustrated) of each of the battery attachment sections 32.

As illustrated in FIG. 3, by sliding the battery 31 downward (parallel translation) as illustrated with respect to the battery attachment section 32 while engaging the rail reception sections 31a and 31a with the rail sections 32a and 32a, it may be possible to mechanically link the battery 31 to the battery attachment section 32. When the battery 31 is mechanically linked to the battery attachment section 32, connection terminals 32b and 32c on the battery attachment section 32 side may be inserted into terminal reception sections 31b and 31c on the battery 31 side to be electrically connected therewith. In addition, when the battery 31 is mechanically linked to the battery attachment section 32, the lock claw 31e may be engaged with the engagement concave section 32d and locked in an attachment state where the battery 31 is fixed in a non-movable state in a sliding direction. In this specification, slidably-attachment-type batteries 31 and 31 mean a battery which can be attached to the battery attachment section 32 by moving the battery in parallel with the battery attachment section 32 while rail sections 32a and 32a on the battery attachment section 32 side being engaged with the pair of rail reception sections 31a and 31a provided on one surface (upper surface) of the battery.

In order to detach the attached battery 31 from the battery attachment section 32, the battery 31 in FIG. 3 may be pulled upward while the unlock button 31f is pressed downward. Accordingly, the rail reception sections 31a and 31a may be removed from the rail sections 32a and 32a, the connection terminals 32b and 32c are separated from the terminal reception sections 31b and 31c, and the battery 31 may be detached from the battery attachment section 32. In this way, since an attachment and a detachment direction of the batteries 31 and 31 may be a vertical direction, the user can easily attach and detach the batteries 31 and 31 to and from the battery attachment sections 32 and 32. In addition, since the batteries 31 and 31 are configured to be detached by being slid upward, it may be possible to prevent the batteries 31 and 31 from accidentally falling due to a careless attachment operation.

When two of the 18V batteries 31 and 31 are attached to the battery attachment sections 32 and 32 provided as described above, both the batteries 31 and 31 may be electrically connected in series and become a power source outputting a rated voltage 36V which is a total voltage. The power source of the rated voltage 36V which is output from the batteries 31 and 31 may activate the electric motor 13, thereby rotating the rotary blade 12.

As illustrated in FIG. 2, when the cutting device main body 10 is positioned at the upper dead point, a center of gravity G of the batteries 31 and 31 may be positioned on a rear side with respect to a vertical surface (a reference line J) passing a vertically tilting center (the shaft center of a vertically tilting shaft 9) of the cutting device main body 10. On the contrary, when the cutting device main body 10 is positioned at the lower dead point, the center of gravity G of the batteries 31 and 31 may be positioned at a front side with respect to the reference line J. For this reason, the center of gravity G of the batteries 31 and 31 may be displaced from the rear side to the front side with respect to the reference line J corresponding to a downward movement operation of the cutting device main body 10. On the other hand, the center of gravity G of the batteries 31 and 31 may be displaced from the front side to the rear side with respect to the reference line J corresponding to an upward movement operation of the cutting device main body 10.

When the cutting device main body 10 is positioned at the upper dead point and the center of gravity G of the batteries 31 and 31 is positioned on the rear side with respect to the reference line J, the weight of the batteries 31 and 31 may serve as an external force (a weight) for positioning and maintaining the cutting device main body 10 to the upper dead point. For this reason, it may be possible to reduce the biasing force of biasing means (torsion spring) for biasing the cutting device main body 10 to a standby position side in an upper direction, by that amount. Thus, it may be possible to reduce the size of the biasing means.

In the course of moving the cutting device main body 10 downward, the center of gravity G of the batteries 31 and 31 may be displaced to the front side with respect to the reference line G, and the weight of both the batteries 31 and 31 may serve as an external force (a weight) for moving the cutting device main body 10 downward, and accordingly serve as a force partially canceling the biasing force of the torsion spring. Because of this, at this time, it may be possible to obtain a sufficient pressing force (cutting force) of the rotary blade 12 with respect to the cutting material W while reducing a pressing operation force of the user. In this regard, it may be possible to improve workability of the tabletop cutting device C1.

As illustrated in FIGS. 1 and 2, in a rear portion of the handle section 20, a handle arm 24 extending from a rear surface to a rear direction of the electric motor 13 may be provided such that a controller-housing part 25 extends in a lateral direction. A controller including a power supply circuit and a motor control circuit may be housed in the controller-housing part 25. Cooling air produced by the electric motor 13 may be blown into the controller housing part 25 so as to cool the controller.

Referring now to FIG. 1, a center of the battery 31 on the left side may coincide with a center of the handle section 20 in a lateral width direction. In addition, in a plane view, the battery 31 on the right side may be disposed in a position protruding from the handle section 20 in a right side direction by substantially the same distance as the electric motor 13.

According to the tabletop cutting device C1 of the first embodiment configured as described above, a 36V-type tabletop cutting device C1 having the electric motor 13 of the rated voltage 36V as a driving source can use two 18V-type batteries 31 and 31 as a power source, instead of using one 36V-type battery. Because of this, the user can use the 18V batteries 31 and 31, which the user already have as a power source of 18V-type electric tools, as a power source of the 36V-type tabletop cutting device C1. In this way, it may be possible to further improve convenience and handling property (usability) of the 36V-type tabletop cutting device C1 as well as to reduce costs of the batteries.

Figure 7:
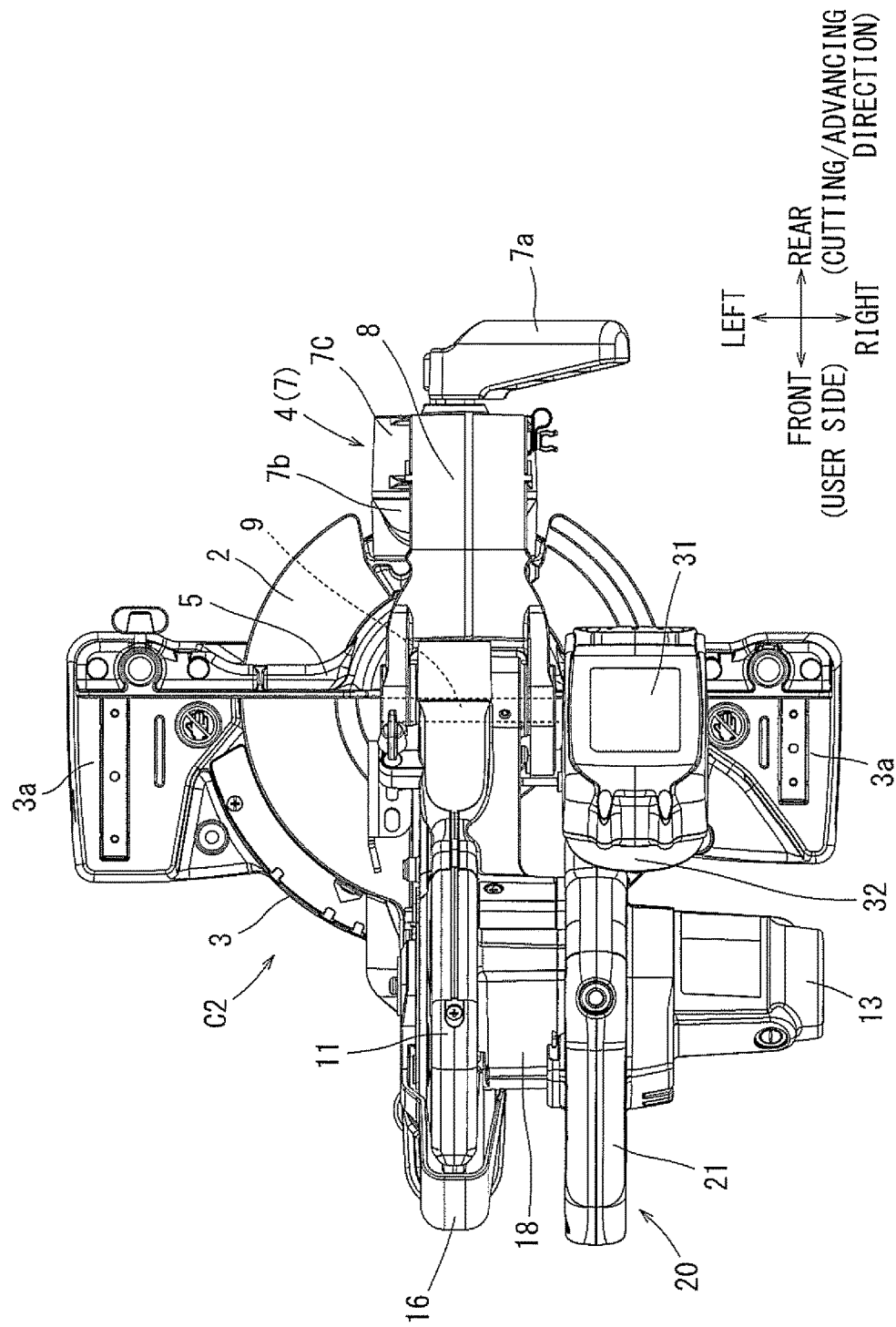
FIG. 7 is a plan view of a tabletop cutting device of a second embodiment.
Figure 8:
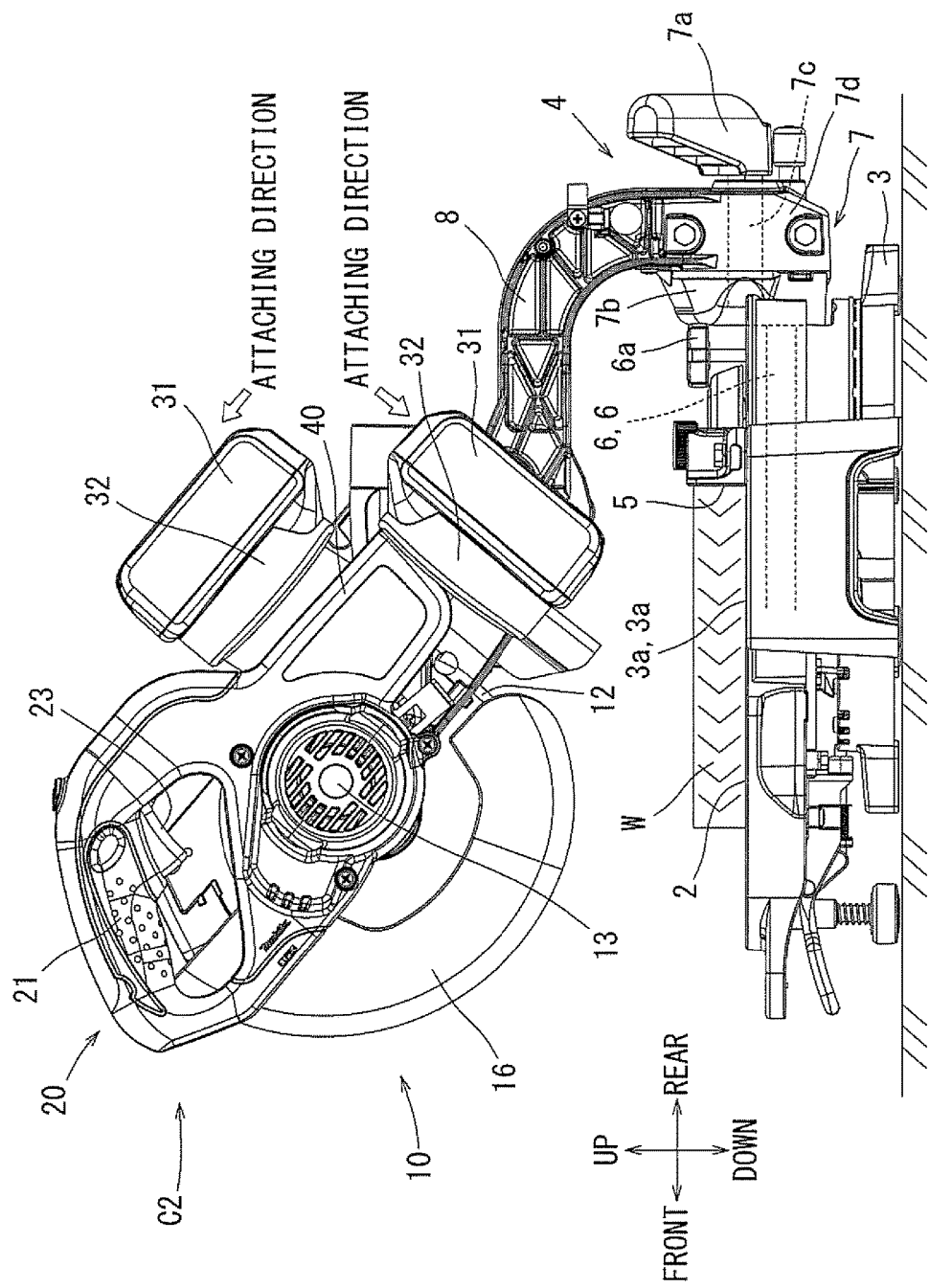
FIG. 8 is a right-side view of the tabletop cutting device of the second embodiment.

A tabletop cutting device C2 of a second embodiment is illustrated in FIGS. 7 and 8. As illustrated in FIG. 8, the tabletop cutting device C2 of the second embodiment is different from the first embodiment in that the tabletop cutting device C2 is provided with only a main grip part 21 and not provided with a sub grip part 22 for carrying. A pedestal frame section 40 may be provided on a rear portion of a handle section 20 so as to protrude from a rear surface of an electric motor 13 in a rear direction. Battery attachment sections 32 may be provided on a top surface and a rear surface of the pedestal frame section 40. It may be possible to attach 18V battery 31 to the battery attachment section 32 on a top surface side and to the battery attachment section 32 on a rear surface side, respectively. Similar to the first embodiment, two 18V batteries 31 and 31 may be electrically connected in series and serve as a power source of the rated voltage 36V.

Because of this construction, according to the tabletop cutting device C2 of the second embodiment, it may be also possible to use the 36V-type tabletop cutting device C2 by utilizing 18V batteries 31 and 31 which are highly prevalent.

As illustrated in an outlined arrow in FIG. 8, in the second embodiment, the attaching direction of the battery 31 on the top surface side may be a direction obliquely upward to the front, and the attaching direction of the battery 31 on the lower side is a direction obliquely downward to the front.

Figure 9:
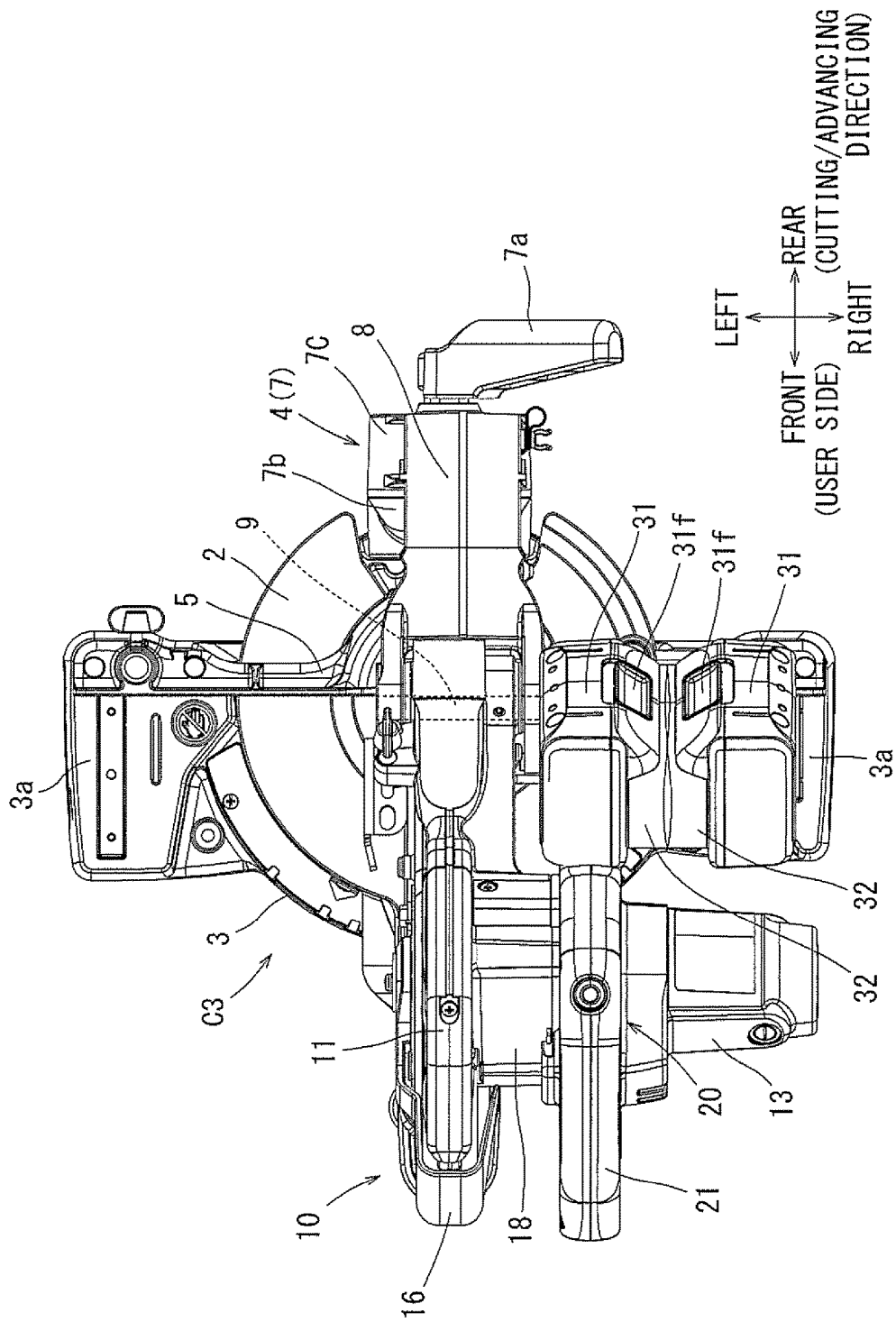
FIG. 9 is a plan view of a tabletop cutting device of a third embodiment.
Figure 10:
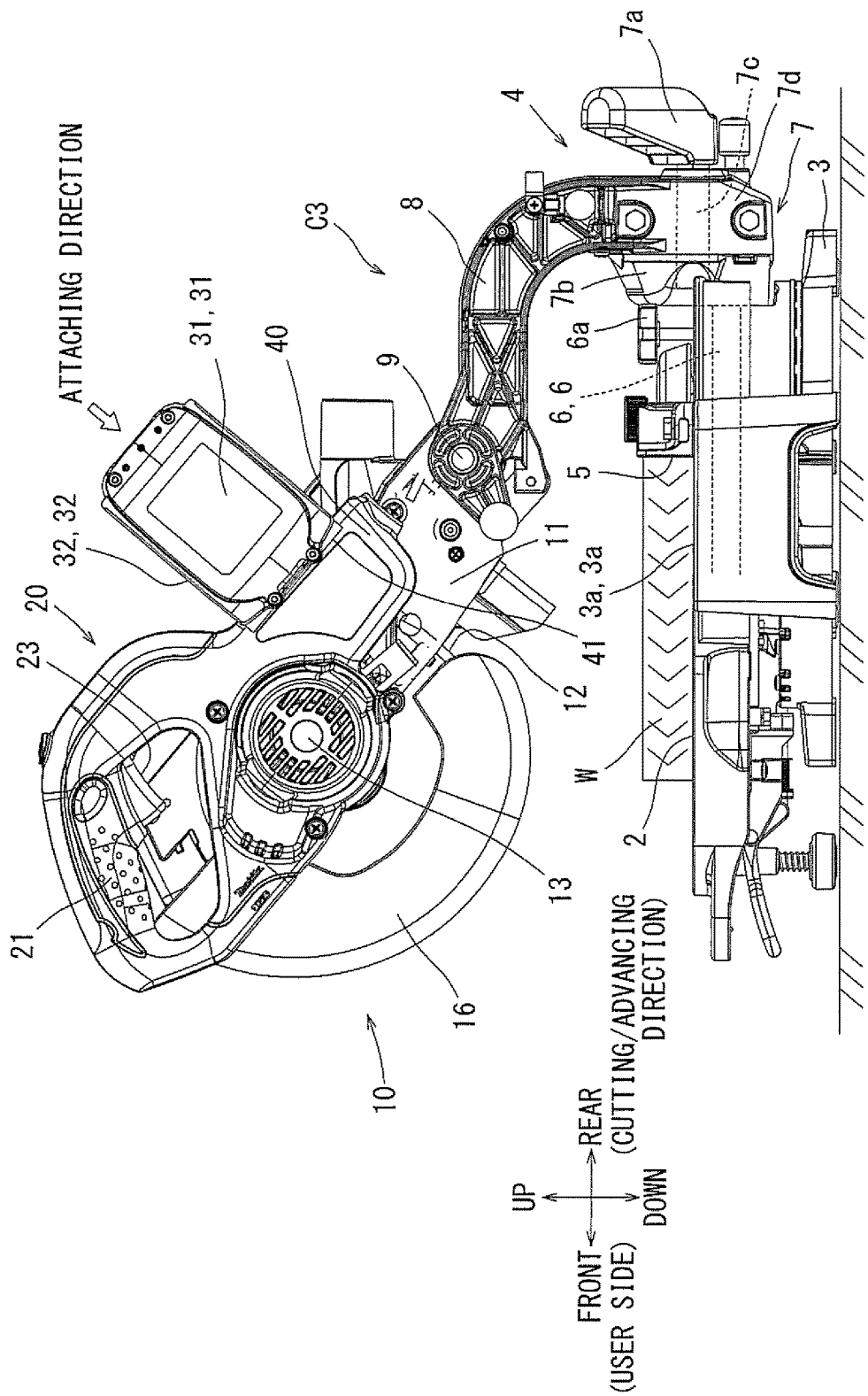
FIG. 10 is a right-side view of the tabletop cutting device of the third embodiment.

A tabletop cutting device C3 of a third embodiment is illustrated in FIGS. 9 and 10. The tabletop cutting device C3 of the third embodiment is different from those of the first and the second embodiments in that two batteries 31 and 31 are attached in a direction of mutually facing a top surface (joint part of the battery attachment sections). As in the second embodiment, in the tabletop cutting device C3 of the third embodiment, a pedestal frame section 40 may be provided on a rear portion of a handle section 20 so as to protrude in a rear direction. A battery base 41 may be provided so as to protrude from a top surface of the pedestal frame section 40 in a right side direction. Two battery attachment sections 32 and 32 may be provided on the top surface of the battery base 41 in a mutually back-to-back state.

One 18V battery 31 may be attached along a left side surface of a battery attachment section 32 on an upper side (left side) in FIG. 9. In addition, one 18V battery 31 may be attached along a right side surface of the battery attachment section 32 on a lower side (right side) in FIG. 9. As illustrated in an outlined arrow in FIG. 10, the attaching direction of the two batteries 31 and 31 may be a direction obliquely downward to the front at an upper dead point of the cutting device main body 10. In the tabletop cutting device C3 of the third embodiment, it may be also possible to use the 36V-type tabletop cutting device C3 by utilizing 18V batteries 31 and 31 which are highly prevalent.

Figure 11:
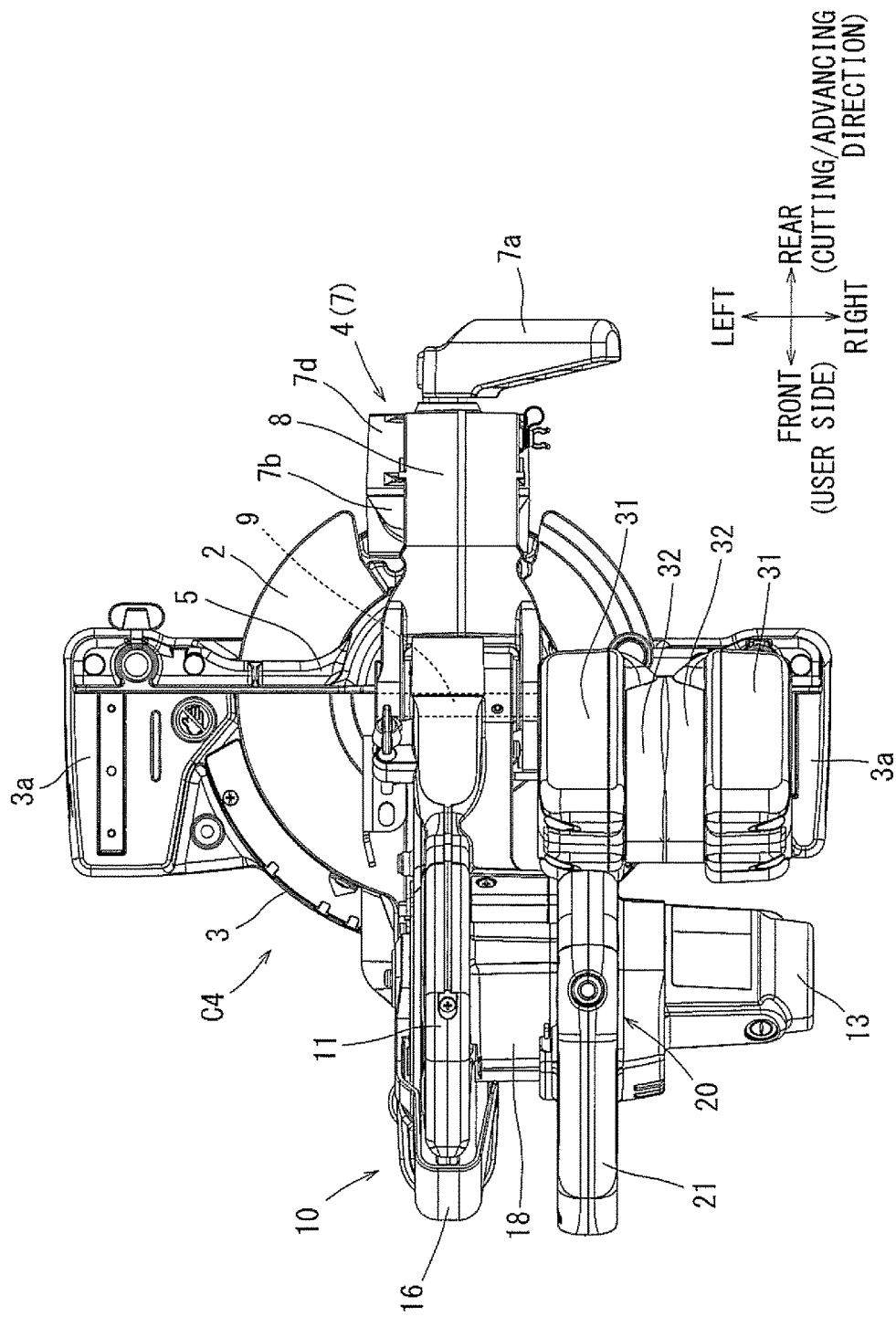
FIG. 11 is a plan view of a tabletop cutting device of a fourth embodiment.
Figure 12:
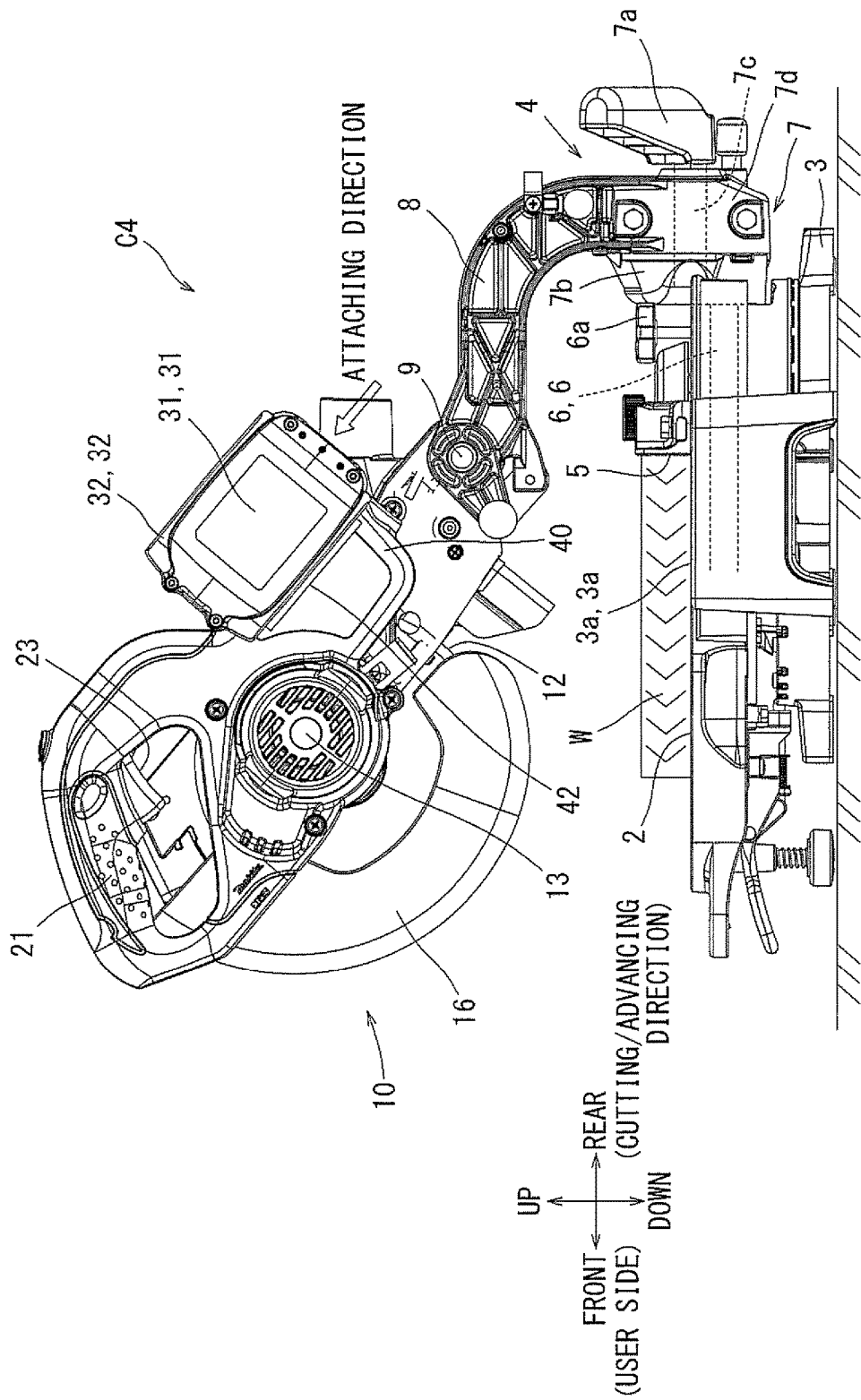
FIG. 12 is a right-side view of the tabletop cutting device of the fourth embodiment.

A tabletop cutting device C4 of a fourth embodiment is illustrated in FIGS. 11 and 12. The tabletop cutting device C4 of the fourth embodiment is different from the tabletop cutting device in the third embodiment in the attaching direction of two batteries 31 and 31. A pedestal frame section 40 may be provided in a rear portion of a handle section 20 so as to protrude in a rear direction. A battery base 42, which protrudes in a right side direction further than in the third embodiment, may be provided on a top surface of a pedestal frame section 40. Two battery attachment sections 32 and 32 may be provided on the top surface of the battery base 42 in a mutually back-to-back state.

One 18V battery 31 may be attached along a left side surface of the battery attachment section 32 on an upper side (left side) in FIG. 11. One 18V battery 31 may be attached along a right side surface of the battery attachment section 32 on a lower side (right side) in FIG. 11. As illustrated in an outlined arrow in FIG. 12, the attaching direction of two batteries 31 and 31 may be a direction obliquely upward to the front at an upper dead point of the cutting device main body 10. In the tabletop cutting device C4 of the fourth embodiment, it may be also possible to use the 36V-type tabletop cutting device C4 by utilizing 18V batteries 31 and 31 which are highly prevalent.

Figure 13:
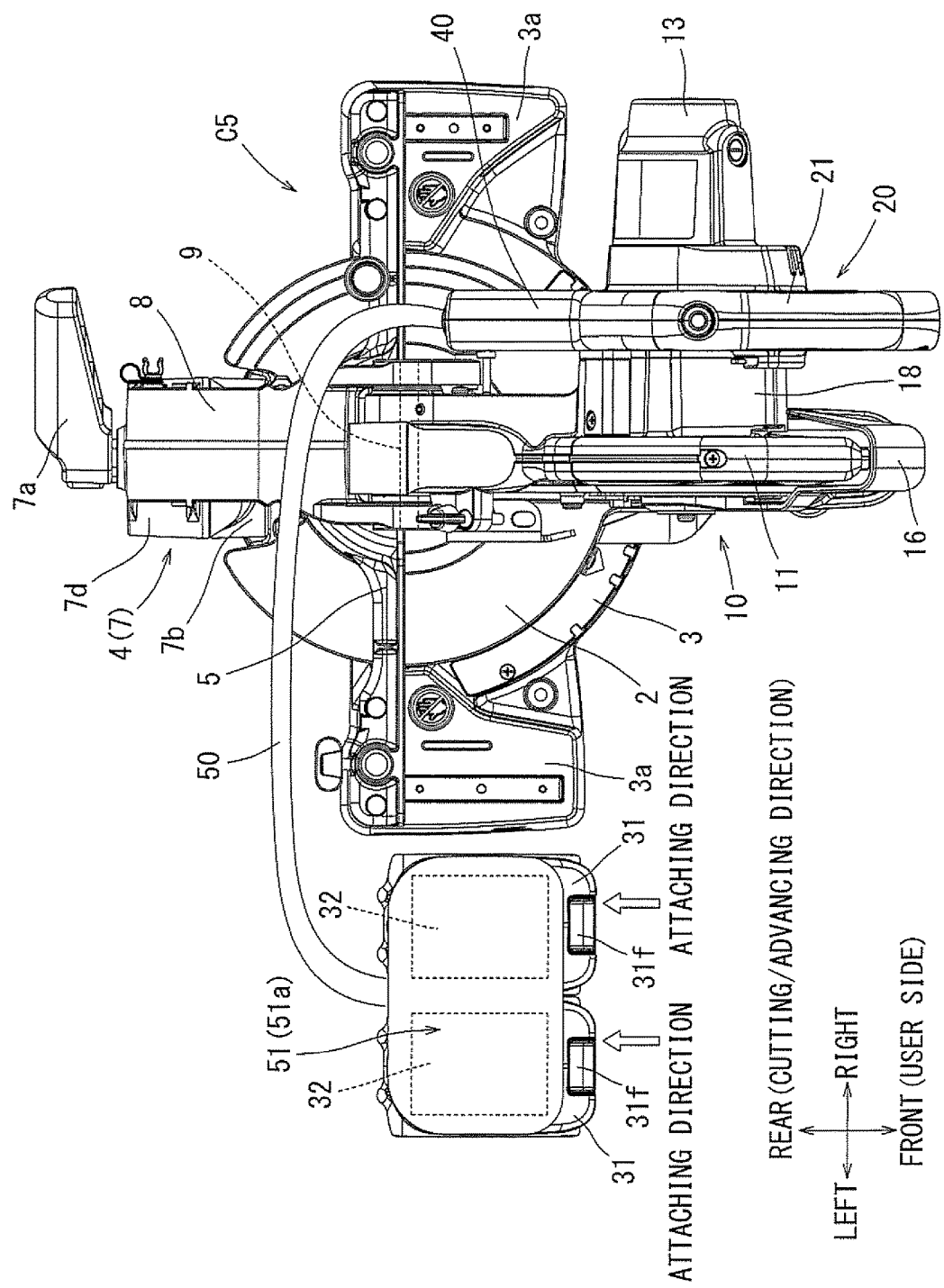
FIG. 13 is a plan view of a tabletop cutting device of a fifth embodiment.
Figure 14:
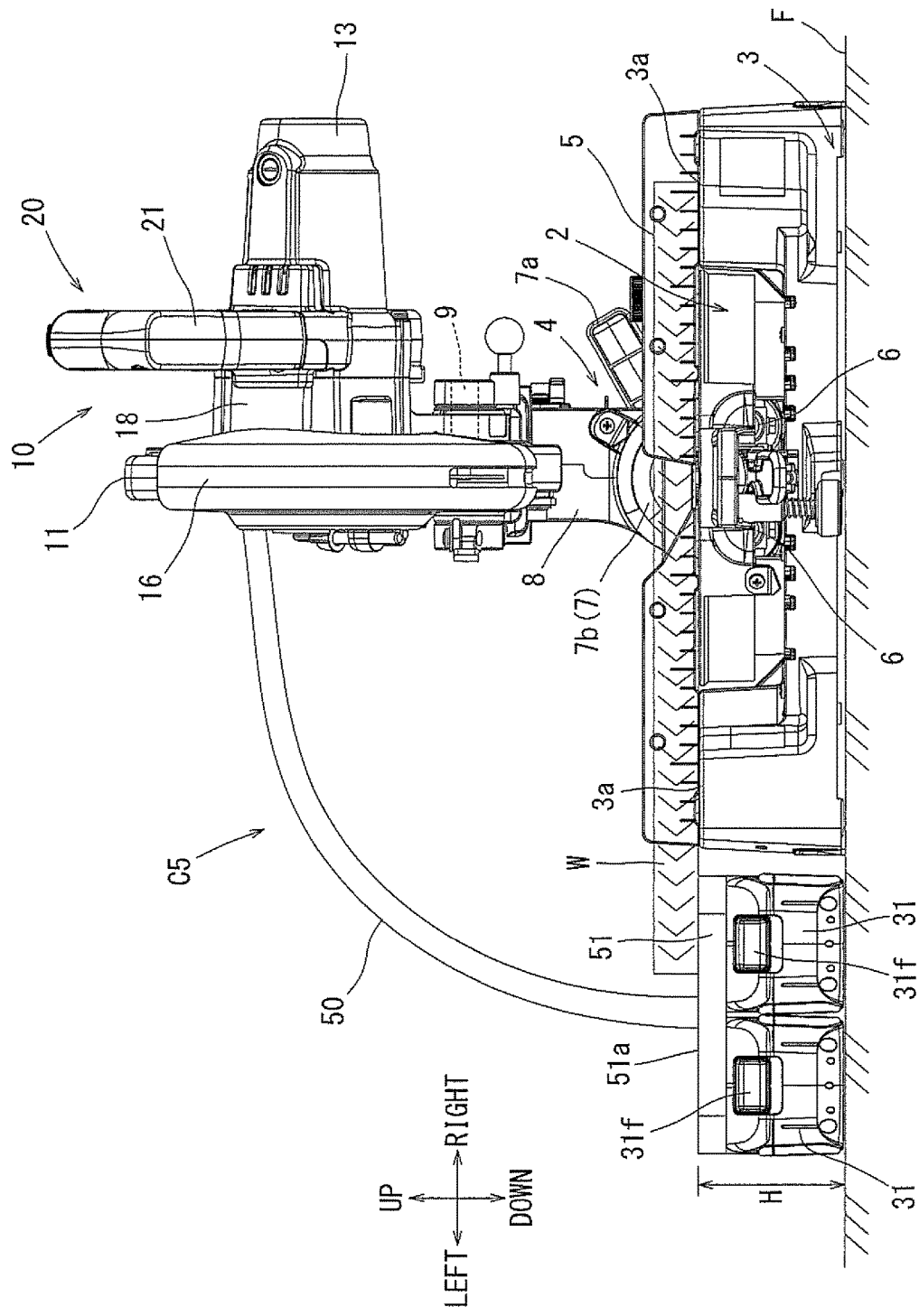
FIG. 14 is a front view of the tabletop cutting device of the fifth embodiment.

A tabletop cutting device C5 of a fifth embodiment is illustrated in FIGS. 13 and 14. The tabletop cutting device C5 of the fifth embodiment is different from the tabletop cutting devices of the first to fourth embodiments in that two batteries 31 and 31 may be configured to be remotely connected to a cutting device main body 10 via a power cord 50.

In the third embodiment and the fourth embodiment, the battery bases 41 and 42 may be integrally provided in the pedestal frame section 40. In the fifth embodiment, a battery base 51 may be separated from a pedestal frame section 40. The battery base 51 may be connected to the pedestal frame section 40 via one power cord 50. The power cord 50 may be pulled into the pedestal frame section 40 and electrically connected to a power source circuit (controller). Two battery attachment sections 32 and 32 may be disposed side by side in the battery base 51 remotely connected via the power cord 50. Two 18V batteries 31 can be attached to each of the battery attachment sections 32 and 32.

As illustrated in FIG. 14, the power cord 50 may have a sufficient length such that the two attached batteries 31 and 31 are placed on the same workbench F on which the tabletop cutting device C5 is placed. A rear surface (a side that is not provided with battery attachment sections 32 and 32, which is a top surface illustrated in the FIG. 51a of the battery base 51 may have an accurately machined flat surface. In addition, the plate thickness of the battery base 51 may be configured such that the rear surface 51a of the battery base 51 may have a height H from an installation surface, and the rear surface 51a may be flush with the surface of auxiliary tables 3a and 3a of a base 3 when two batteries 31 and 31 attached to the battery attachment sections 32 and 32 are placed on the work bench F, as illustrated in FIG. 14.

As illustrated in the figure, by directing the rear surface 51a of the battery base 51 upward and placing the two batteries 31 and 31 on the work bench F so as to be adjacent to the auxiliary table 3a on one side, the rear surface 51a of the battery base 51 may serve as an auxiliary table which can complement the auxiliary tables 3a and 3a. In this way, it may be possible to place a larger cutting material W in a more stable manner.

In this way, in the tabletop cutting device C5 of the fifth embodiment, it may be also possible to use the 36V-type tabletop cutting device C5 by utilizing two 18V batteries 31 and 31 which are used as a power source of other electric tools and are highly prevalent. Accordingly, compared to a case of using one 36V battery, it may be possible to improve convenience and handling property of the 36V-type tabletop cutting device C5 as well as to reduce costs of the batteries.

In addition, according to the tabletop cutting device C5 of the fifth embodiment, it may be possible that the battery base 51 for attaching the two batteries 31 and 31 may have both a battery attachment function and a function as an auxiliary table. In this regard, it may be possible to further increase added value of the tabletop cutting device C5.

Figure 15:
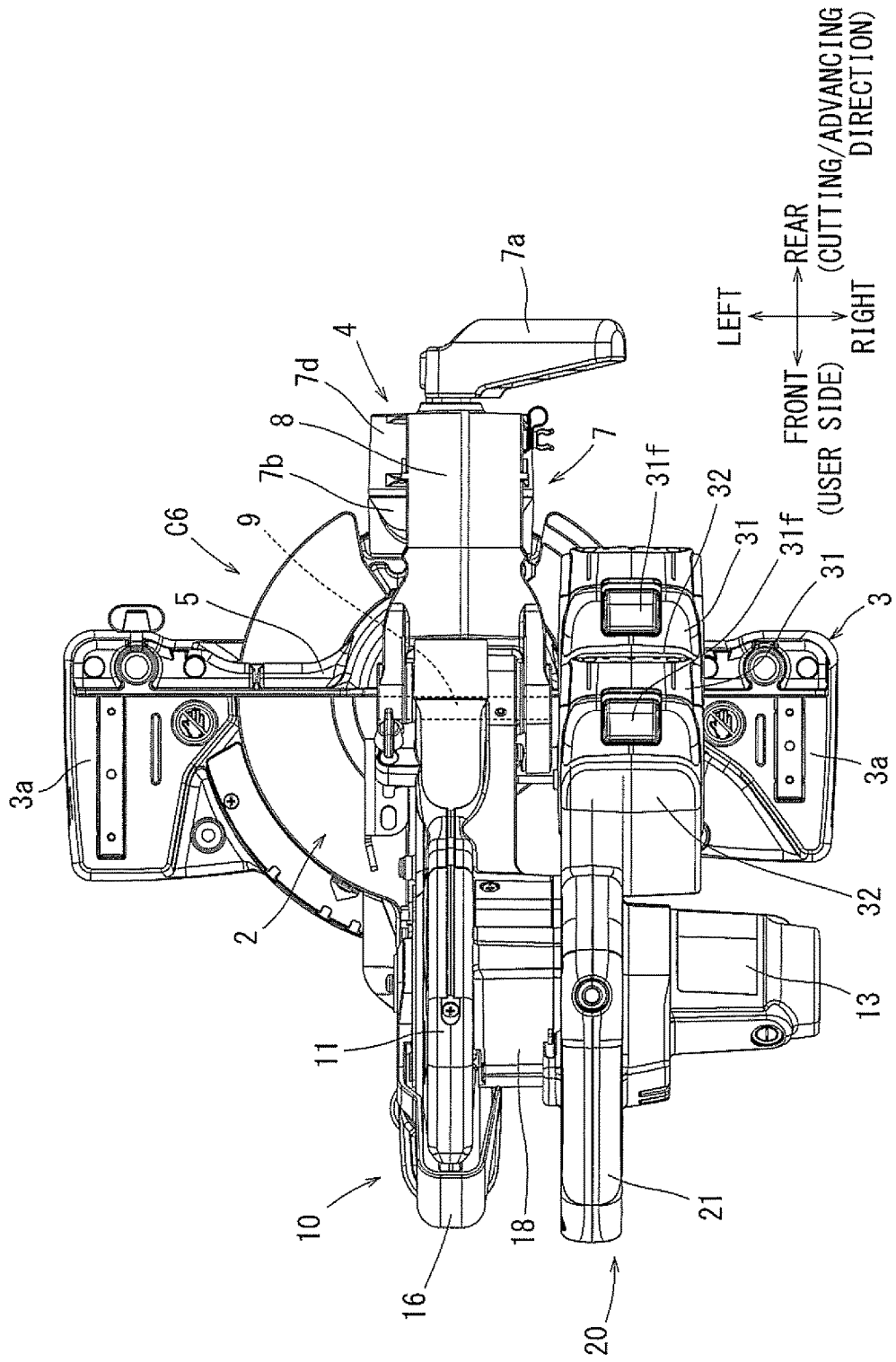
FIG. 15 is a plan view of a tabletop cutting device of a sixth embodiment.
Figure 16:
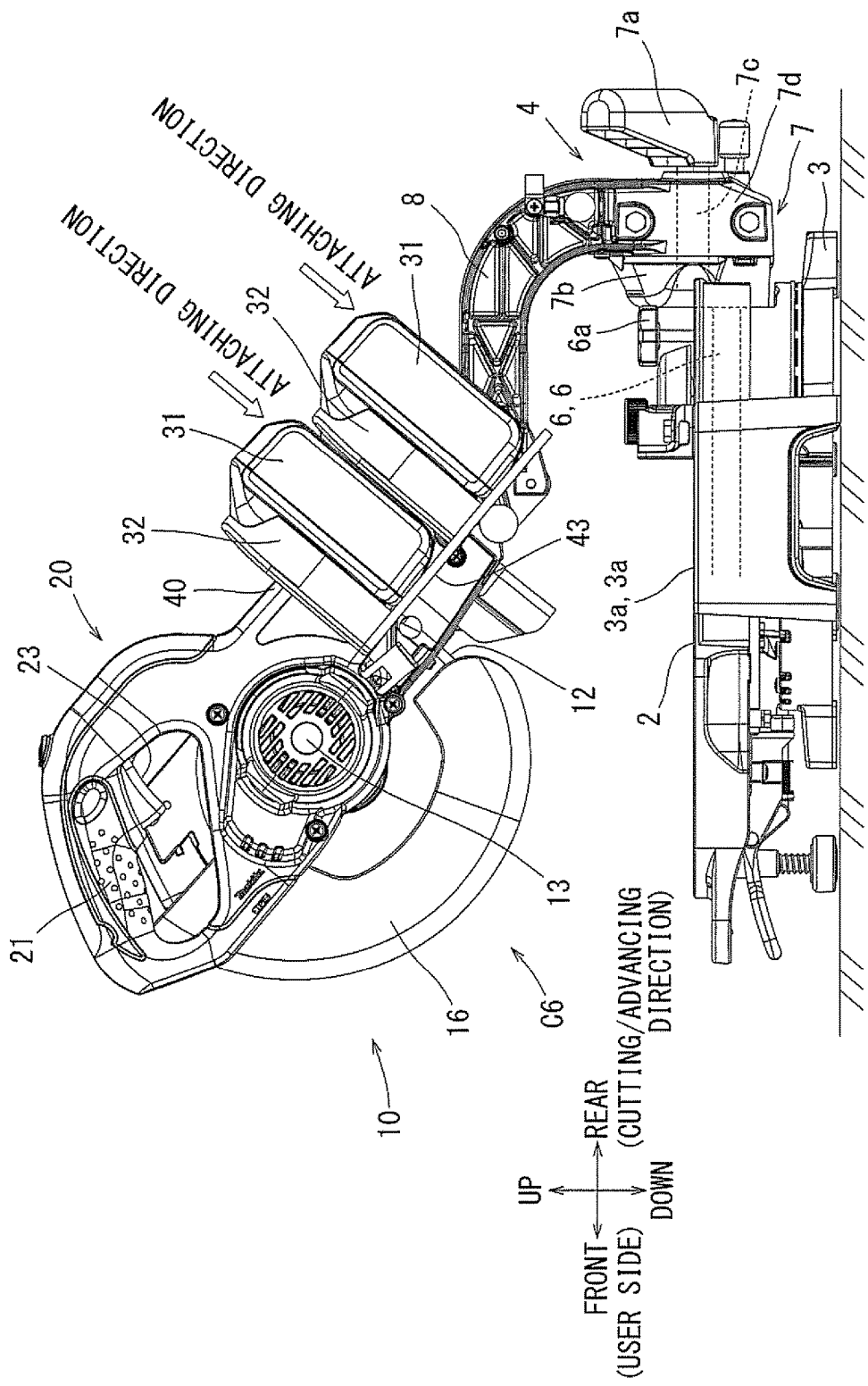
FIG. 16 is a right-side view of the tabletop cutting device of the sixth embodiment.

A tabletop cutting device C6 of a sixth embodiment is illustrated in FIGS. 15 and 16. Similar to the tabletop cutting device in the second to fourth embodiments, the tabletop cutting device C6 of the sixth embodiment may be configured to be capable of attaching two batteries 31 and 31 to a pedestal frame section 40 provided on a rear portion of a handle section 20. In the tabletop cutting device C6 of the sixth embodiment, two batteries 31 and 31 may be aligned in a front-rear direction, and are vertically attached such that an attaching and detaching direction may be a vertical direction.

A battery base 43 may be provided in the pedestal frame section 40 provided on a rear portion of the handle section 20 so as to protrude in a right side direction. The longitudinal direction of the battery base 43 may be along the front-rear direction (in a direction in which the pedestal frame section 40 extends). Two battery attachment sections 32 and 32 may be attached to a top surface of the battery base 43 so as to stand and protrude in an upward direction, being disposed side by side at a predetermined distance with each other. As illustrated in FIG. 16, when the cutting device main body 10 is positioned at an upper dead point, batteries 31 may be respectively attached to each battery attachment sections 32 and 32 by being slid obliquely downward to the front. Although not illustrated, when the cutting device main body 10 is maintained at an end position of downward movement, the attaching direction of both the batteries 31 and 31 may be substantially a vertical direction.

Figure 17:
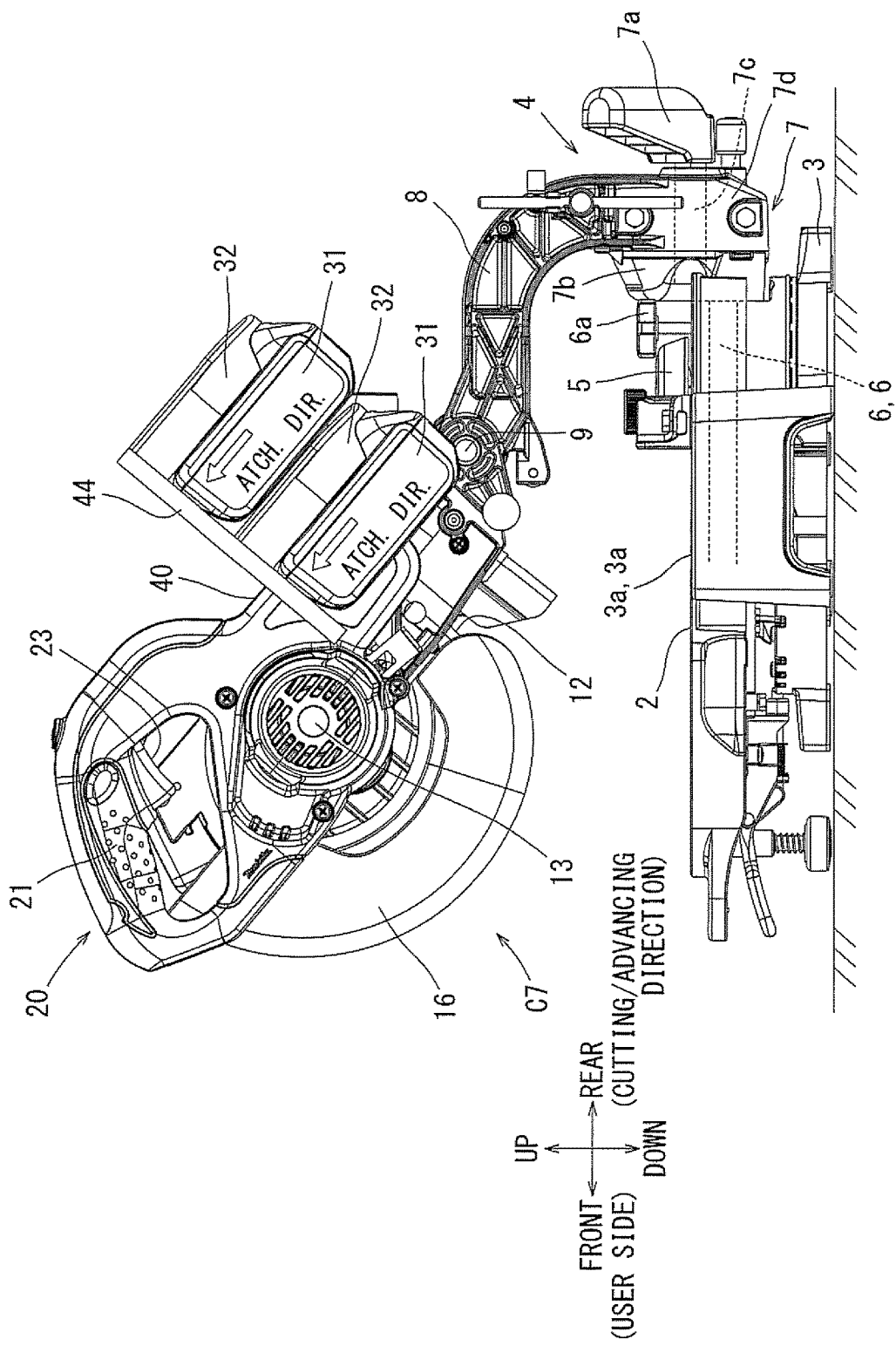
FIG. 17 is a right-side view of a tabletop cutting device of a seventh embodiment, illustrating a state where a cutting device main body is returned to a standby position (upper dead point) in an upper portion.
Figure 18:
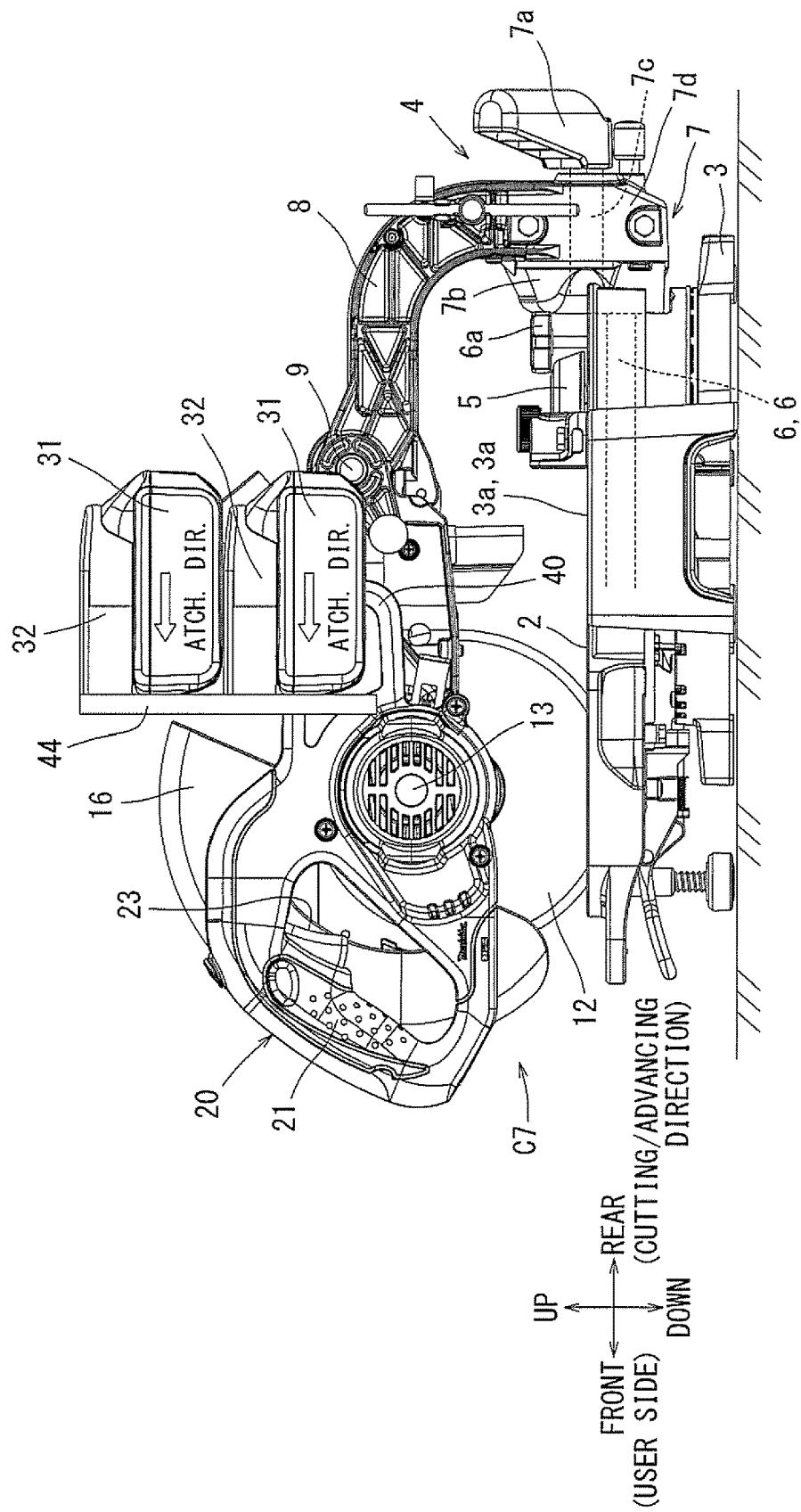
FIG. 18 is a right-side view of the tabletop cutting device of the seventh embodiment, illustrating a state where the cutting device main body is operated to move downward to a downward movement end position (lower dead point).

FIGS. 17 and 18 illustrate a tabletop cutting device C7 of a seventh embodiment. The tabletop cutting device C7 is different from the above-described sixth embodiment in the attaching direction of the two batteries 31 and 31, and other configurations are the same as those in the sixth embodiment. In the sixth embodiment, when the cutting device main body 10 is positioned at an upper dead point, the attaching direction of the batteries 31 and 31 may be a direction obliquely downward to the front as illustrated in FIG. 16. However, in the seventh embodiment, the attaching direction may be a direction obliquely upward to the front as illustrated in FIG. 17. In addition, in the sixth embodiment, when the cutting device main body 10 is positioned at the lower dead point, the attaching and detaching direction of the batteries 31 and 31 may be a vertical direction. However, in the seventh embodiment, the attaching and detaching direction of the batteries 31 and 31 may be a horizontal direction as illustrated in FIG. 18.

In the seventh embodiment, a battery base 44 may be provided in a pedestal frame section 40 provided on a rear portion of a handle section 20. The longitudinal direction of the battery base 44 may be along a vertical direction (in a direction orthogonal to a direction in which the pedestal frame section 40 extends). Two battery attachment sections 32 and 32 may be respectively attached to the rear surface of the battery base 44 so as to protrude in a rearward direction, being disposed side by side at two upper and lower steps at a predetermined distance from each other. Two 18V batteries 31 and 31 may be respectively attached to a lower surface side of each of the battery attachment sections 32 and 32.

Figure 19:
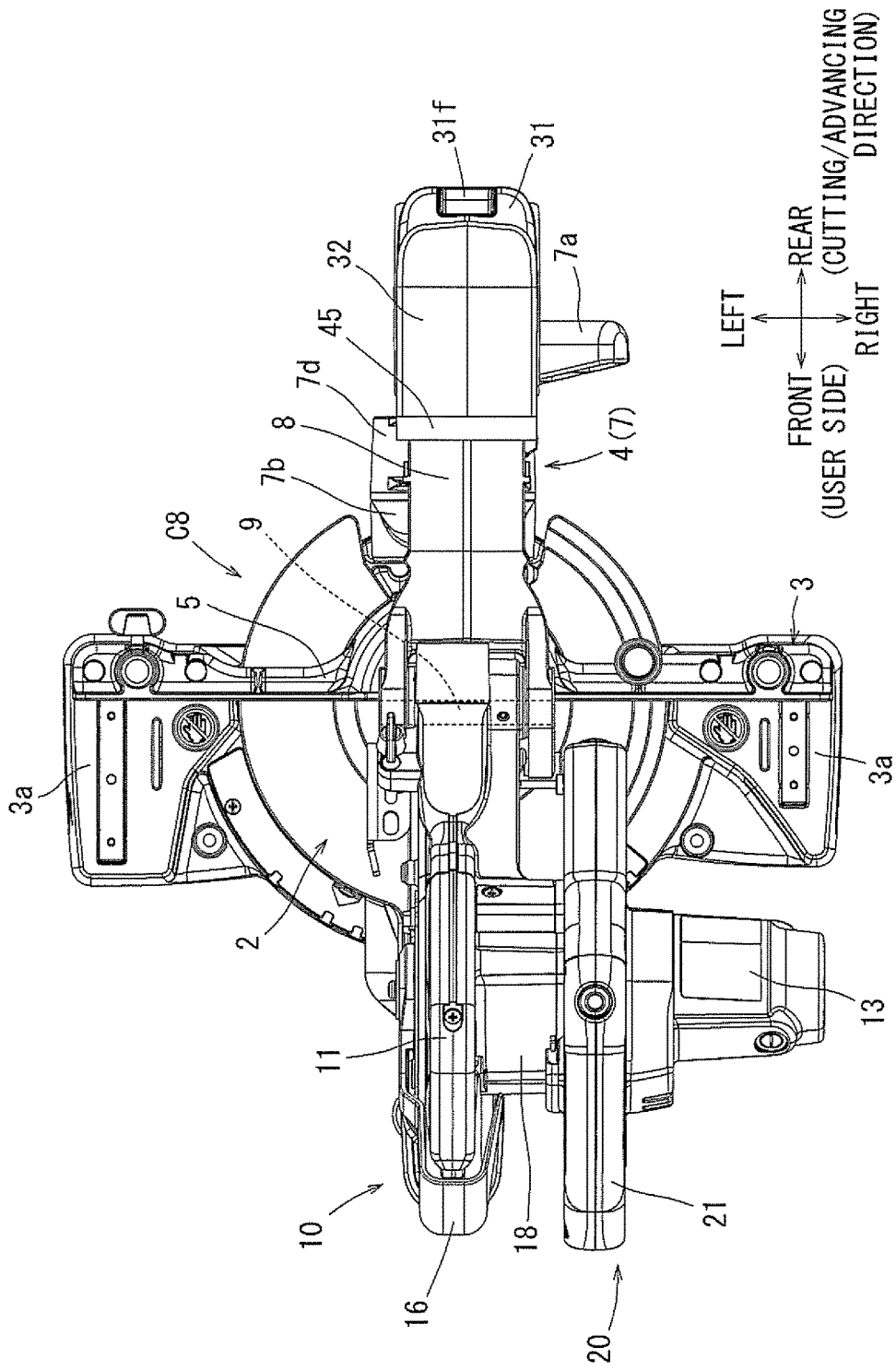
FIG. 19 is a plan view of a tabletop cutting device of an eighth embodiment.

FIGS. 19 and 20 illustrate a tabletop cutting device C8 of a eighth embodiment. In the eighth embodiment, a battery base 45 may be provided in the right-left tilt supporting mechanism 7 that may be composed of a main body support section 4. The battery base 45 may be provided so as to rise in an upward direction across a tiltable section 7*d* of the right-left tilting mechanism 7 and a main body supporting arm 8. As illustrated in FIG. 20, two battery attachment sections 32 and 32 may be respectively attached to the rear surface of the battery base 45, protruding in a rearward direction and being disposed at two upper and lower steps at a predetermined distance from each other. Two 18V batteries 31 and 31 may be respectively attached to the lower surface side of the battery attachment sections 32 and 32. Each of the batteries 31 and 31 can be attached by being slid toward the front as illustrated in an outlined arrow in FIG. 20.

In the eighth embodiment, the attaching direction of the batteries 31 and 31 may be fixed in a horizontal direction in a side view at an upper dead point position and also at a lower dead point position of the cutting device main body 10. In this respect, the eighth embodiment is different from the sixth embodiment and the seventh embodiment. In the eighth embodiment, even if the cutting device main body 10 is vertically displaced in a cutting work, the positions of the batteries 31 and 31, and the battery attachment sections 32 and 32 may not change. However, when the cutting device main body 10 is tilted to the left or the right by the right-left tilt supporting mechanism 7, the batteries 31 and 31 and the battery attachment sections 32 and 32 may be displaced to the left direction or the right direction, accordingly.

In the tabletop cutting devices C6, C7, and C8 according to the sixth to eighth embodiments configured as described above, it may be possible to use the 36V-type tabletop cutting devices C6, C7, and C8 by utilizing two 18V batteries 31 and 31 which are used as a power source of other electric tools. In this way, compared to a case where one 36V battery is prepared, it may be possible to improve convenience and handling property of the 36V-type tabletop cutting devices C6, C7, and C8 as well as to reduce costs of the batteries.

In the above-described first to eighth embodiments, further modifications can be implemented. For example, tabletop cutting devices C1 to C8 capable of sliding the cutting device main body 10 in the front-rear direction are exemplified. However, it may be possible to obtain the same operational effect by using two 18V batteries connected in series as a power source of the rated voltage 36V-type electric motor 13 in a tabletop cutting device in which a slide function is not included and the cutting device main body can be simply moved in a vertical direction to perform a cutting work.

In the above, the configuration of attaching the two 18V batteries 31 and 31 is exemplified. However, it may be possible to attach N lithium-ion batteries of the rated voltage nV in series and to use the batteries as power sources of output voltage (n×N)V.

Furthermore, the rear portion of the handle section 20 is mainly exemplified as a position of attaching the two 18V batteries 31 and 31, in consideration of workability at the time of a cutting work. However, a configuration may be employed in which a battery attachment section 32 is provided on the side portion or the inner portion of the right-left auxiliary tables 3*a* and 3*a*, and multiple batteries can be attached thereto. By attaching multiple batteries 31 to 31 on the base 3 side, it may be possible to improve stability of installation state of the tabletop cutting device and improve workability and handling properties of the tabletop cutting device at the time of a cutting work.

What is claims is:

1. A tabletop cutting device comprising:
a table configured to support a workpiece;
a cutting device main body having a first end pivotably attached to the table such that the cutting device main body can be operated in a vertically movable manner with respect to the table;
a main grip part extending in a direction intersecting to a longitudinal direction of the cutting device main body at a second end opposing to the first end of the cutting device main body, and held by a user when the cutting device main body is operated in the vertically movable manner;
an electric motor provided at the cutting device main body near the second end of the cutting device main body, wherein the electric motor is configured to rotate a circular rotary blade; and
a plurality of battery attachment sections configured such that rechargeable batteries are attached to the plurality of battery attachment sections, wherein the plurality of battery attachment sections are arranged side by side with each other in a longitudinal direction of the cutting device main body between the first end and the second end of the cutting device main body,
wherein the plurality of battery attachment sections are orientated such that the rechargeable batteries can be attached to the plurality of battery attachment sections through sliding the rechargeable batteries with respect to the plurality of battery attachment sections in a direction that is perpendicular to the longitudinal direction of the cutting device main body and substantially parallel to a longitudinal direction of the main grip part, and
wherein the plurality of battery attachment sections are positioned such that the rechargeable batteries attached to the plurality of battery attachment sections overlap with the main grip part as seen in the longitudinal direction of the cutting device main body.

* * * * *